United States Patent [19]

Aid

[11] Patent Number: 4,600,512
[45] Date of Patent: Jul. 15, 1986

[54] REVERSE OSMOSIS WATER PURIFICATION MODULE

[75] Inventor: James D. Aid, St. Petersburg, Fla.

[73] Assignee: Baxter Travenol Laboratories, Inc., Deerfield, Ill.

[21] Appl. No.: 710,519

[22] Filed: Mar. 11, 1985

Related U.S. Application Data

[63] Continuation of Ser. No. 447,856, Dec. 8, 1982, abandoned.

[51] Int. Cl.[4] ............................................. B01D 13/00
[52] U.S. Cl. .................................. 210/433.2; 210/450; 210/494.1
[58] Field of Search ................... 210/321.1, 450, 433.2, 210/34.5, 494.1, 456

[56] References Cited

U.S. PATENT DOCUMENTS

| | | | |
|---|---|---|---|
| 3,386,583 | 6/1968 | Merten | 210/494.1 X |
| 3,542,203 | 11/1970 | Hancock et al. | 210/433.2 X |
| 3,690,465 | 9/1972 | McGinnis et al. | 210/321.1 |
| 4,070,280 | 1/1978 | Bray | 210/321.1 X |
| 4,244,820 | 1/1981 | Hauk et al. | 210/456 X |
| 4,299,702 | 11/1981 | Bairinji et al. | 210/321.5 X |

*Primary Examiner*—Frank Spear
*Attorney, Agent, or Firm*—Paul C. Flattery; Kay M. Pierce; R. A. Benziger

[57] ABSTRACT

A module containing a reverse osmosis membrane for a water purification system is provided. A membrane assembly is mounted in the center of a pressure vessel with a seal surrounding the membrane assembly between the outside of the assembly and the inner wall of the pressure vessel. An inlet port passes through the pressure vessel and enters the vessel between the seal and one end of the pressure vessel in close prximity to the seal. An outlet port passes through the pressure vessel at a point between the seal and the other end of the pressure vessel, also in close proximity to the seal. The water pressure differential between the two ports maintains the integrity of the seal and their location insures a turbulent water flow throughout the module.

6 Claims, 3 Drawing Figures

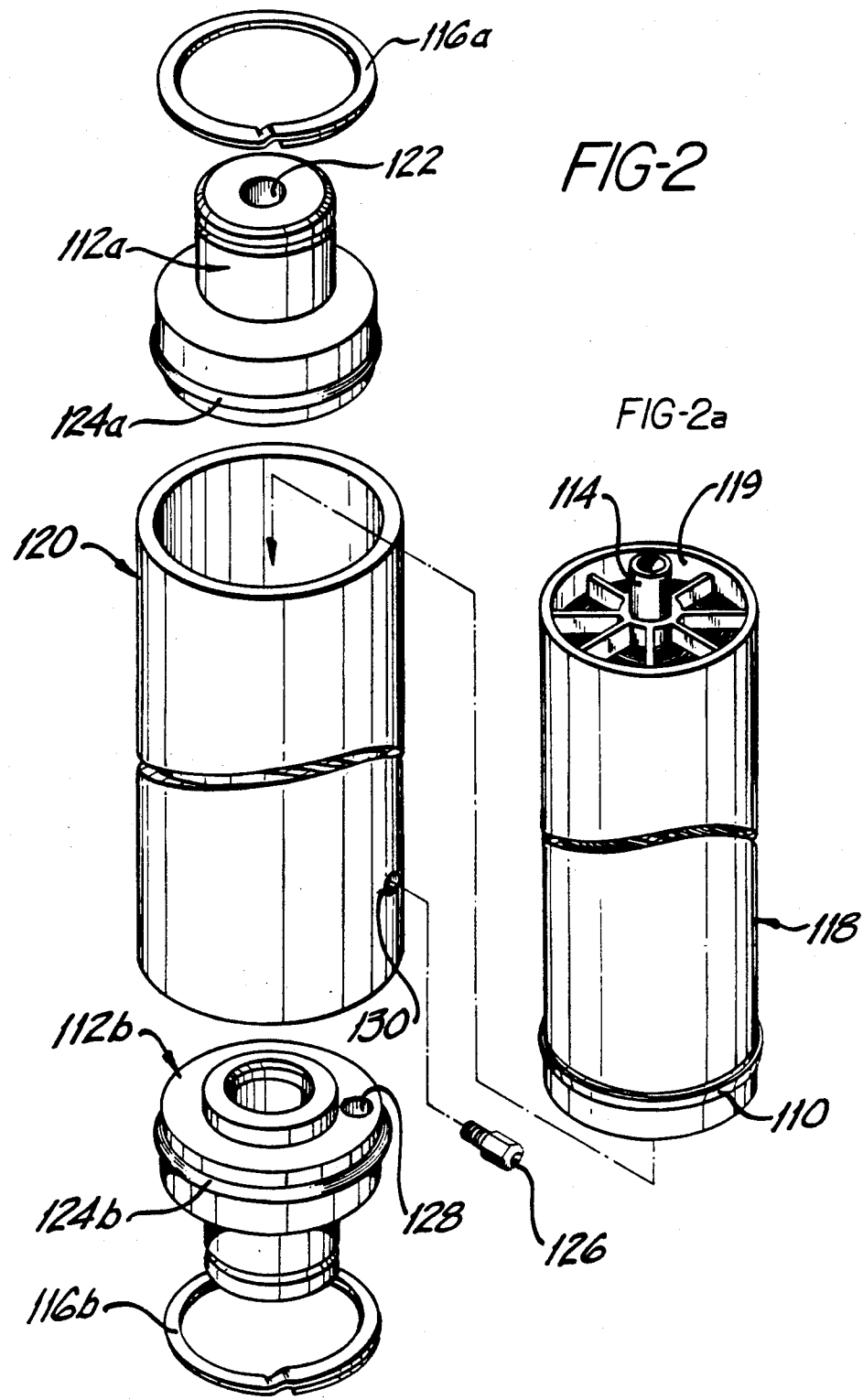

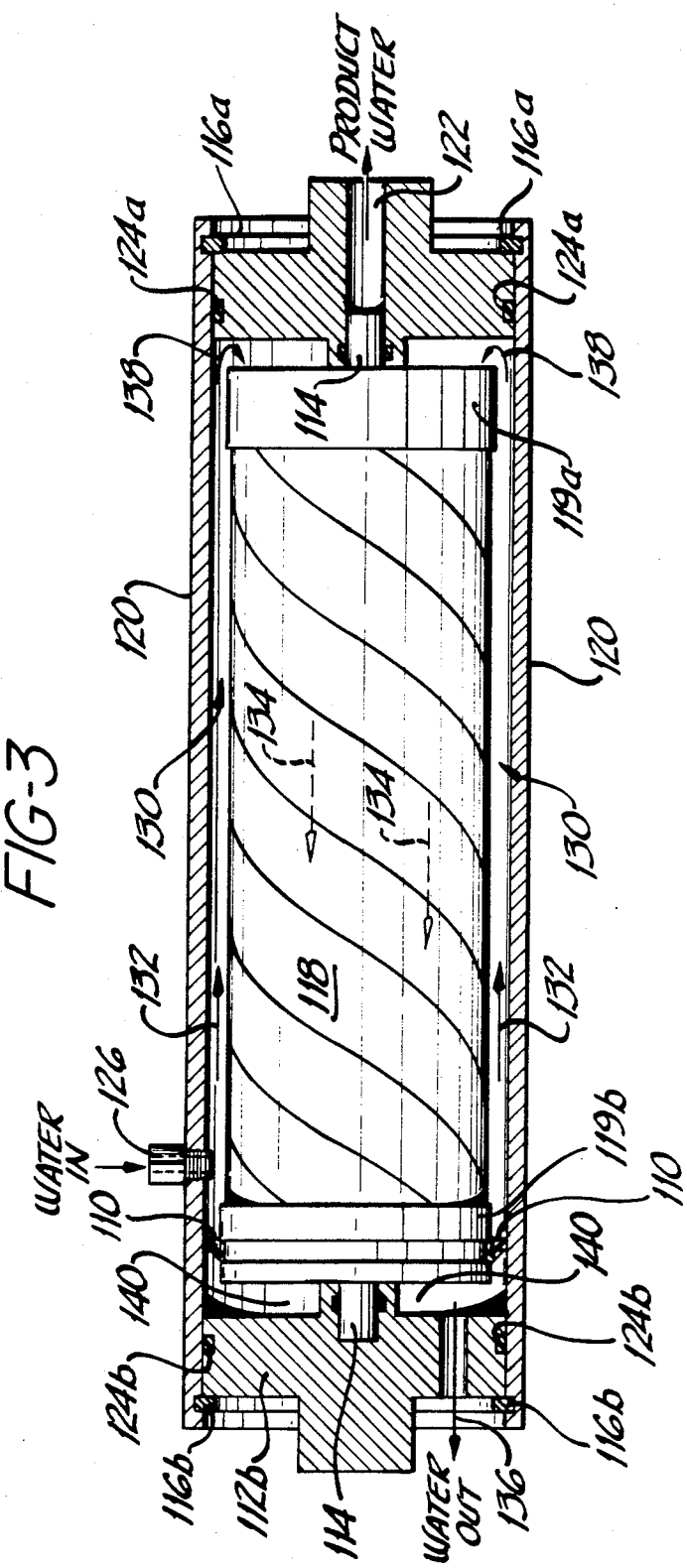

REVERSE OSMOSIS WATER PURIFICATION MODULE

This is a continuation of application Ser. No. 447,856, filed Dec. 8, 1982, now abandoned.

This invention relates to reverse osmosis water purification systems and, in particular, to membrane modules for reverse osmosis systems.

The need for purified water frequently arises in a medical setting. For instance, purified water is generally required when performing hemodialysis on a patient requiring such treatment. In hemodialysis, impurities in a patient's blood are removed by diffusing them across a membrane and into a specially prepared dialysate fluid. A considerable amount of dialysate fluid is required for a typical hemodialysis treatment, which fluid is generally prepared using purified water.

One technique used to purify water is the reverse osmosis process. In this process, a stream of untreated water is pumped at elevated pressure into a pressure resistant vessel containing a semipermeable membrane. Some of the water permeates across the membrane and is collected as purified product water in a low pressure output line while the remainder of the original stream exits the vessel, where it is depressurized for recirculation or disposal.

The semipermeable membrane contained within the pressure vessel is conventionally wound as a flat coil, together with spacer materials, around a center support mandrel. This cylindrical assembly may be held together at the cylindrical sides by tape or shrink tubing, and is capped on the ends with perforated molded plastic end pieces. The cylindrical membrane assembly is rigidly mounted coaxially in a cylindrical pressure vessel, which is capped at the ends and includes three water ports: an inlet water port, through which water to be purified enters the vessel; a product water port, through which purified water exits the vessel; and an outlet port through which untreated concentrate water leaves the vessel.

During use, pressurized water enters the inlet port and flows into the membrane assembly through one of the perforated end pieces. A seal located between the outside of the membrane assembly and the inner wall of the pressure vessel prevents inlet water from flowing around the outside of the membrane assembly and directly to the outlet port. As the water flows through the membrane assembly, some of the water passes through the membrane. This purified water works its way to the tubular support mandrel, where it collects and flows out the product water port. The remaining untreated concentrate water exits the membrane assembly through the other perforated end piece and flows out the outlet port.

The seal between the membrane assembly and the pressure vessel wall creates a pocket of relatively stagnant water in the volume between the membrane assembly and the pressure vessel wall. This water pocket is of relatively little consequence during the water purification process, but poses a disadvantage during sterilization. When the reverse osmosis system is sterilized prior to use, a solution containing a sterilizing agent is pumped through the membrane module. The sterilizing solution may only partially migrate into the stagnant water in the pocket, which inhibits sterilization in that part of the module. Moreover, when sterilization is completed and rinse water is pumped through the module, the lack of flow turbulence in the stagnant pocket will permit the retention of a residue of sterilizing solution in the pocket. Thus, it is desirable to eliminate this stagnant water pocket and the adverse effects resulting from it.

In accordance with the principles of the present invention, a reverse osmosis membrane module is provided which exhibits a water flow pattern that prevents the formation of a stagnant water pocket surrounding the membrane assembly. A membrane assembly is mounted in the center of a pressure vessel with a seal surrounding the membrane assembly between the assembly and the inner vessel wall. An inlet port passes through the pressure vessel between the seal and a first end of the pressure vessel in close proximity to the seal. An outlet port for untreated concentrate water passes through the pressure vessel between the seal and a second end of the pressure vessel, also in close proximity to the seal.

Water entering the module will thereby flow in a relatively turbulent manner around the outside of the membrane assembly, between the outer surface of the membrane assembly and the inner wall of the pressure vessel. The water will then enter one end of the assembly, and exit the other end of the assembly and flow out of the outlet port. A relatively turbulent flow of water is thus present throughout virtually all of the membrane module.

In the drawings:

FIG. 2 is an assembly drawing for a reverse osmosis membrane module constructed in accordance with the principles of the present invention; and FIG. 3 is a cross-sectional view of a reverse osmosis membrane module constructed in accordance with the principles of the present invention.

Figure 1:
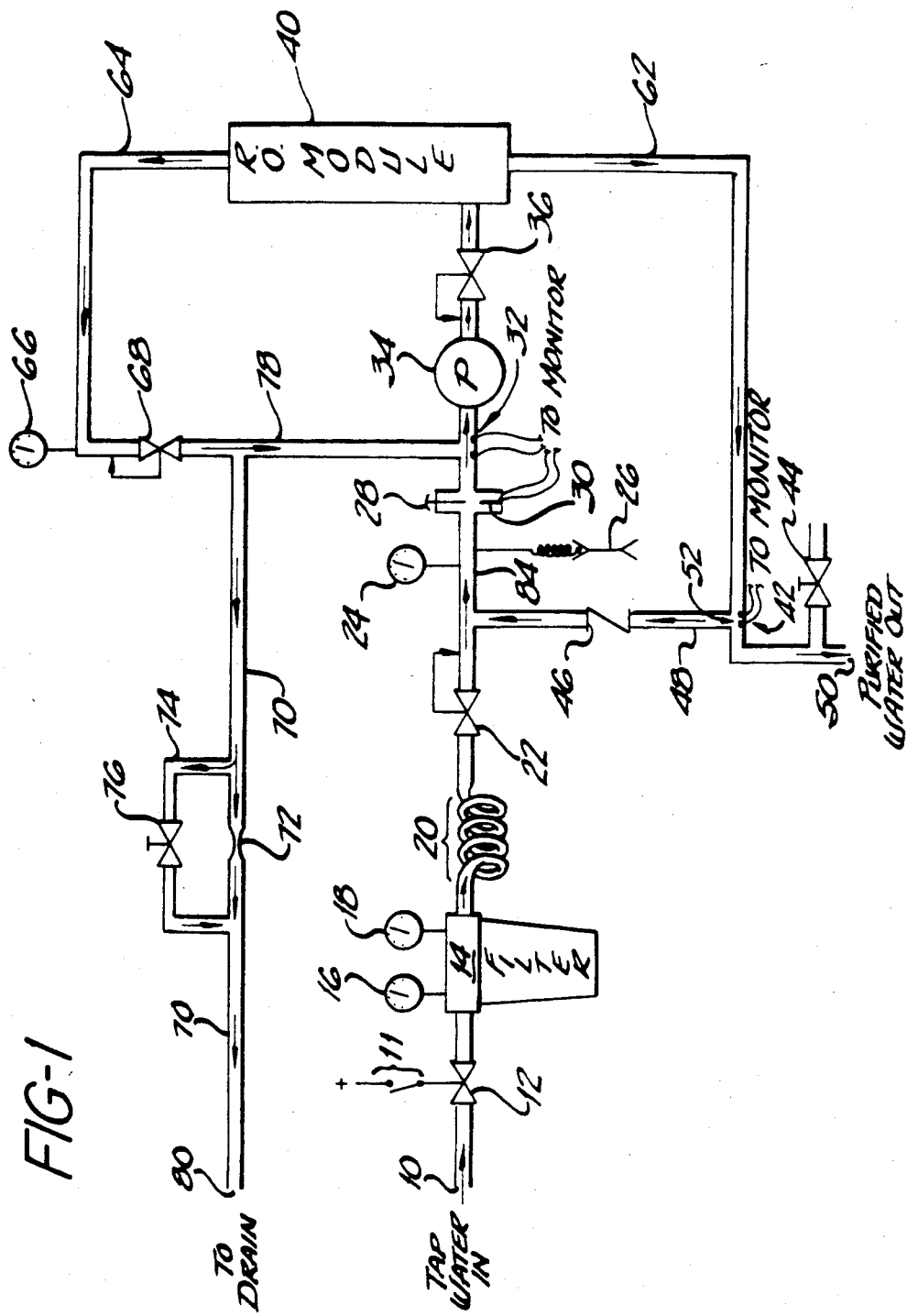
FIG. 1 illustrates schematically a reverse osmosis water purification system constructed in accordance with the principles of the present invention.

Referring to FIG. 1, a reverse osmosis system constructed in accordance with the principles of the present invention is shown schematically. Untreated tap water enters the system through an inlet 10, and is passed by an inlet solenoid valve 12 under control of an on/off switch 11. The inlet water enters a filter 14, which filters out particulate matter and removes the chlorine from the inlet water. The filter includes a ten micron carbon impregnated filter element. The chlorine must be removed since chlorine can damage the membrane used in the reverse osmosis module. The water pressure at the inlet and outlet of the filter 14 is monitored by gauges 16 and 18. During normal operation the gauge pressure should be virtually the same. A greater than 10 psi differential between the inlet and outlet gauges of the filter 14 indicates that the filter is becoming clogged and should be replaced.

The filtered water then flows through a coil of tubing 20, which is wound around the motor of a pump 34. The inlet water then flows through a pressure regulator 22. The pressure regulator 22 controls the water pressure at its outlet so that the water pressure will not exceed 20 psi. Depending upon the pressure of the inlet water, water pressure at the input to the pressure regulator can exceed 20 psi. A flow of inlet water, now at approximately 20 psi, enters the inlet line 84 to the pump and reverse osmosis module.

In the inlet line 84, a pressure gauge 24 monitors water pressure to insure that water pressure remains at about 20 psi. A one psi check valve 26 is coupled to the inlet line 84 to inject formalin into the inlet water. The injected formalin is used to sanitize the water since the water now has no chlorine content. The inlet water flows past a pressure switch 28, which turns the system off if water pressure in the inlet line 84 drops below 6 psi. The pressure switch 28 thereby protects the pump against cavitation. A temperature sensor 30 senses the inlet water temperature and provides an output signal to a monitor (not shown). The inlet water also flows past a conductivity cell 32, which also provides an electrical signal for the monitor.

The inlet water then enters the pump 34, which increases the water pressure from about to 20 psi to approximately 200 psi. The pressurized water is applied to the reverse osmosis module 40 by way of a 25 psi check valve 36. This check valve 36 closes when the outlet water pressure of the pump drops below 25 psi to prevent the instantaneous reflection of high water pressure back to the gauge 24 when the pump 34 is turned off. This is to protect the gauge and other components in the low pressure 20 psi loop preceding the pump.

Inlet water, now at 200 psi enters the reverse osmosis module 40 where some of the water permeates the module membrane to produce purified product water in outlet line 62. The balance of the inlet water which does not permeate the membrane exits the module through a line 64. The module outlet pressure in line 64 remains at about 200 psi and is monitored by a pressure gauge 66. The reverse osmosis membrane may comprise, for example, a thin-film composite membrane formed by a depositing a thin polymer coating on a microporous polysulfone support layer.

The water pressure in the outlet line 64 is maintained at approximately 200 psi by a back pressure regulator 68, which opens when the water pressure in line 64 exceeds 200 psi. Water passed by the back pressure regulator flows into a drain line 70 and a recirculation line 78. The water in the recirculation line 78 reenters the inlet line 84 at a point opposite the conductivity cell 32. Water in the drain line 70 passes through a 500 cc per minute orifice 72 and then to the drain through an outlet 80. A line 74 bypasses the orifice 72 during rinsing operations, at which time the rinse valve 76 is opened.

Purified product water in line 62 flows past a conductivity cell 42, which detects the level of impurities remaining in the water. The purified water then is free to flow out of an outlet 50. A sampling port 44 may be opened if it is desirable to take a sample of the purified water. When the both the sampling port 44 and the outlet 50 are closed, the purified water pressure builds in a return line 48, which soon opens a one psi check valve 46. The unused purified water then recirculates through the system by reentering the inlet line 84.

An assembly drawing of a reverse osmosis module suitable for use in the arrangement of FIG. 1 and constructed in accordance with the principles of the present invention is shown in FIG. 2. A reverse osmosis membrane assembly 118 includes a perforated central mandrel 114. A flat coil reverse osmosis membrane and spacer material are wound around the mandrel, with the ends of the membrane connected to the perforations of the central mandrel 114. Purified water which passes through the membrane is thereby collected in the central mandrel 114. The wrapped membrane assembly is held together on the outside by taping the outer cylindrical surface and the outer circumference of top and bottom molded plastic end pieces 119, one of which is shown in FIG. 2. Water enters the assembly for purification by passing between the spokes of the plastic end pieces. Toward the bottom of the membrane assembly 118 is a groove for a rubber lip seal 110.

The membrane assembly 118 is mounted in a pressure vessel 120 and is held coaxially therein by top and bottom end plugs 112a and 112b. The central mandrel 114 of the membrane assembly extends into mating apertures of the end plugs to retain the membrane assembly in its desired position. Water-tight seals are maintained between the end plugs and the inner surface of the pressure vessel 120 by O rings 124a and 124b located around the end plugs. The central mandrel aperture 122 of the upper end plug passes completely through the end plug to permit passage of purified water from the central collecting mandrel 114 to the outside of the module. The end plugs 112a and 112b are held in place by retaining clips 116a and 116b.

Water which is to be purified enters the module through an inlet fitting 126 which screws into a hole in the side of the pressure vessel 120 so as to enter the space between the inner wall of the pressure vessel 120 and the membrane assembly 118 just above the assembled location of the lip seal 110. Untreated concentrate water exits the module through an aperture 128 which passes through the lower end plug 112b.

An assembled reverse osmosis module, constructed in accordance with the principles of the present invention, is shown partially in cross-section in FIG. 3. The membrane module 118 is centered in the pressure vessel 120, held in place by the insertion of the ends of the central mandrel 114 into apertures in the pressure vessel end plugs 112a and 112b. The end plugs 112a and 112b are held in place by the retaining clips 116a and 116b which fit into grooves in the inner surface of the pressure vessel 120. The O rings 124a and 124b insure a water-tight fitting between the end plugs and the inner wall of the presssure vessel. A lip seal 110 is located in a groove in module assembly end piece 119b.

An inlet fitting 126 is screwed into the side of the pressure vessel 120 near the lip seal 110. Purified product water exits the membrane assembly 118 through the central mandrel 114 and an aperture 122 in pressure vessel and plug 112a. Untreated concentrate water which has passed through the membrane assembly leaves the module through an aperture 128 in pressure vessel end plug 112b.

In operation, untreated water at a pressure of approximately 200 p.s.i. enters through the inlet port 126 near the lip seal 110 and flows along the outside of the membrane assembly 118 in the space 130 as shown by arrows 132. The water then flows as shown by arrows 138 into the membrane assembly 118. The untreated water passes through the membrane assembly from right to left in the drawing where it experiences a slight pressure drop. Brine (concentrate) water exits the membrane assembly through the end cap 119b and into the space 140. The brine water then exits the module through aperture 128 as indicated by arrow 136.

Untreated water is prevented from flowing from the inlet fitting 126 to the space 140 by the lip seal 110. The water pressure in the space 140 is a function of the flow rate through the module. Since the water in the space 140 is at a slightly lower pressure than the water at the inlet, this pressure differential forces the lip seal to open and form a tight seal between the outer surface of the membrane assembly 118 and the inner surface of the pressure vessel 120 as shown by the opened position of the lip seal 110 in FIG. 3.

A relatively turbulent flow of water exists throughout the reverse osmosis module. Since the inlet water enters the pressure vessel near the lip seal 110 and into the space which surrounds the membrane assembly 118, the water will flow around the membrane assembly in a turbulent, somewhat spiral-like flow pattern to the perforations in the end cap 116a. The pressurized water then forces its way through the membrane assembly 118 as indicated by arrows 134 and into the space 140 near the lip seal 110. The pressurized water then flows out the aperture 128. Thus it is seen that a forced water flow exists throughout all of the module, while also maintaining the pressure differential necessary to force open the lip seal 110.

Modifications of the arrangement of FIG. 3 are also possible which are in keeping with the principles of the present invention. For instance, the outlet aperture 128 could extend from the space 140 through the side of the pressure vessel instead of through the end plug 112b. Also, the water flow path in the module could be reversed, with untreated inlet water entering through aperture 128 and outlet water exiting the module through the fitting 126. These modified arrangements will also provide turbulent water flow throughout virtually all of the reverse osmosis module.

What is claimed is:

1. In a water purifying membrane module of the type comprising a membrane assembly having a first end with an inlet port for receiving water to be purified, a second end with an outlet port at which untreated water may exit the assembly, an outer surface located therebetween and a second outlet port located in one of said first and second ends for emitting product water and a pressure vessel for encasing said membrane assembly having first and second ends with an inner surface located therebetween, said first and second ends of said pressure vessel in alignment with said first and second ends of said membrane assembly, respectively; wherein the improvement comprises:
a seal surrounding said membrane assembly at said membrane assembly second end in sealing engagement between said assembly outer curcumferential surface and said pressure vessel inner surface;
an inlet port passing through said pressure vessel between said seal and said first end of said pressure vessel in relatively close proximity to said seal;
a product water outlet port passing through said pressure vessel and communicating with said second outlet of said membrane assembly; and
an untreated water outlet port passing through said pressure vessel in fluid communication with said assembly untreated water outlet port and in relatively close proximity to said seal.

2. The water purifying membrane module of claim 1, wherein said pressure vessel comprises a cylinder having first and second ends comprising first and second end plugs, said inlet port passing through said cylinder and opposing said circumferential surface, said first membrane assembly outlet port passing through said first end plug, and said second membrane assembly outlet port communicating with an aperture in said second end plug.

3. The water purifying membrane module of claim 2, wherein said membrane assembly includes a central mandrel protruding from the ends of said assembly, the ends of said mandrel being inserted in apertures in said first and second end plugs so as to retain said membrane assembly in said pressure vessel and to emit product water from at least one of said ends.

4. In a water purification module of the type comprising a membrane assembly having first and second spatially displaced ends, an outer circumferential surface located between said ends, an inlet for receiving water to be purified located in one of said first and second ends and an outlet for exiting untreated water in the other of said first and second ends and a pressure vessel for encasing said membrane assembly including a cylinder having first and second end plugs, said first and second end plugs in alignment with said first and second membrane assembly ends, the improvement comprising:
a seal surrounding said membrane assembly at said membrane assembly first end in sealing engagement between said assembly outer circumferential surface and the inner surface of said cylinder;
an outlet port passing through said pressure vessel cylinder in relatively close proximity to said seal and communicating with said membrane assembly untreated water outlet; and
an inlet port passing through said pressure vessel and communicating with said membrane assembly inlet, wherein said inlet port is separated from said outlet port within said pressure vessel by said seal and is in relatively close proximity to said seal.

5. A water purifying membrane module comprising:
a pressure vessel including a cylinder having first and second end plugs;
a cylindrical membrane assembly containing a water purifying membrane having an impervious outer surface and fluid openings into said cylindrical membrane assembly at the ends thereof for passing water to be treated into the assembly and untreated water out of the assembly and including a separate opening for emitting product water from the assembly;
said assembly being mounted within said pressure vessel between said end plugs whereby a space is formed between said assembly and said pressure vessel at said assembly ends and about said assembly;
a seal surrounding the assembly and in fluid tight contact with the outer surface of the assembly and the inner surface of the pressure vessel defining first and second spaces, said first space being in fluid communication with said untreated water inlet and said second space being in fluid communication with said untreated water fluid outlet, said seal being positioned to minimize the volume of said second space in relation to said first space; and
a second untreated water port passing through said pressure vessel into said first space in close proximity to said seal whereby the volume of said first space between said seal and said second untreated water port will be minimized in relation to the rest of said first space.

6. The water purifying membrane module of claim 5, further comprising first and second end caps located about the respective cylindrical ends of said membrane assembly, wherein said seal is mounted on said first end cap.

* * * * *